United States Patent
Bohnke et al.

(10) Patent No.: US 7,424,079 B2
(45) Date of Patent: Sep. 9, 2008

(54) RECEIVING APPARATUS AND SYNCHRONISING METHOD FOR A DIGITAL TELECOMMUNICATION SYSTEM

(75) Inventors: Ralf Bohnke, Esslingen (DE); Thomas Dolle, Stuttgart (DE); Tino Konschak, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 57 days.

(21) Appl. No.: 11/498,080

(22) Filed: Aug. 3, 2006

(65) Prior Publication Data

US 2006/0269008 A1 Nov. 30, 2006

Related U.S. Application Data

(62) Division of application No. 09/510,652, filed on Feb. 22, 2000, now Pat. No. 7,154,975.

(30) Foreign Application Priority Data

Feb. 24, 1999 (EP) .................................. 99103546

(51) Int. Cl.
*H04L 25/38* (2006.01)
(52) U.S. Cl. ...................... 375/368; 375/365
(58) Field of Classification Search .............. 375/260, 375/343, 354, 365, 366, 368; 370/203, 206, 370/208, 509, 511, 513, 514; 327/141
See application file for complete search history.

(56) References Cited

U.S. PATENT DOCUMENTS

| 4,598,413 A | 7/1986 | Szechenyi |
| 5,005,144 A | 4/1991 | Nakajima et al. |
| 5,267,264 A | 11/1993 | Shlenker et al. |
| 5,539,751 A | 7/1996 | Sabel |
| 5,629,639 A | 5/1997 | Williams |
| 5,812,523 A | 9/1998 | Isaksson et al. |
| 5,991,289 A | 11/1999 | Huang et al. |
| 6,009,125 A | 12/1999 | Ballarin et al. |
| 6,088,406 A | 7/2000 | Suzuki |
| 6,160,821 A | 12/2000 | Dolle et al. |
| 6,246,735 B1 | 6/2001 | Sano et al. |

FOREIGN PATENT DOCUMENTS

| EP | 0 702 467 | 3/1996 |
| EP | 0 836 294 | 4/1998 |
| WO | WO 98 10421 | 3/1998 |

OTHER PUBLICATIONS

Schaub T. et al. "Frame Synchronization for Spontaneous Transmissions" Communications: Connecting the Future, San Diego, Dec. 2-5, 1990, vol. 1, pp. 617-622, XP000218800.

*Primary Examiner*—Betsy L Deppe
(74) *Attorney, Agent, or Firm*—Oblon, Spivak, McClelland, Maier & Neustadt, P.C.

(57) ABSTRACT

A receiving apparatus for receiving signals in a digital telecommunication system and a synchronizing method for synchronizing the receiving apparatus. The receiving apparatus includes a receiver for receiving a reference symbol having at least two repetition patterns. One of the, repetition patterns is phase-shifted in relation to the other. The receiving apparatus is synchronized in the digital telecommunication system using the received reference symbol. The synchronization includes a cross correlation of at least one of two repetition patterns within a cross correlation window having a predetermined length. In this manner, the performance and the accuracy of a cross correlation peak detection can be enhanced for improved synchronization.

6 Claims, 6 Drawing Sheets

RECEIVING APPARATUS AND SYNCHRONISING METHOD FOR A DIGITAL TELECOMMUNICATION SYSTEM

CROSS-REFERENCE TO RELATED APPLICATIONS

This application is a Divisional Application of, and claims the benefit of priority under 35 U.S.C. §120 from, U.S. application Ser. No. 09/510,652, filed Feb. 22, 2000, (now U.S. Pat. No. 7,154,975) and claims the benefit of priority under 35 U.S.C. §119 from European Patent Application No. 99103546.0, filed Feb. 24, 1999. The entire contents of

BACKGROUND OF THE INVENTION

The present invention relates to a receiving apparatus for receiving signals in a digital telecommunication system and to a synchronizing method for synchronizing such a receiving apparatus. Particularly, the receiving apparatus and the synchronizing method of the present invention use a cross correlation mechanism to achieve accurate time and frequency synchronization.

Digital telecommunication systems generally need a synchronization of a transmitting side and a receiving side. The transmitting side and the receiving side can be base stations and mobile stations of a telecommunication system, whereby the synchronization of the timing and the frequency of transmitted signals is usually performed in the mobile station, although other configurations are possible. To achieve a synchronization, it is known to transmit a special training sequence or a reference symbol. Such a reference symbol is usually embedded in the transmission data structure and regularly sent so that a synchronization can be performed regularly.

In FIG. 1, a general structure of a receiving apparatus is shown. The receiving apparatus can be a mobile station of a wireless digital telecommunication system.

Although the present invention essentially relates to the receiving part of telecommunication terminal, it is to be understood, that the receiving part or receiving apparatus of the present invention can also be a or part of a receiving and transmitting terminal.

The receiving apparatus 1 shown in FIG. 1 comprises an antenna 2 for receiving signals from a transmitting side, e. g. a base station of a wireless digital telecommunication system. The received signals 2 are supplied to a HF means (High Frequency means) 3, which downconverts the received high frequency signals into the base band. The downconverted signals are supplied to a IQ-demodulation means, where they are demodulated and supplied to a synchronizing means.

The synchronizing means performs time and frequency synchronization using a received training sequence or reference symbol, as stated above. Using the synchronization information of the synchronizing means 5, the received user data signals are further processed in the receiving apparatus 1, e. g. decoded by a decoding means 6 and so on, to be made available in visible or audible form for a user. Usually the synchronization in the synchronizing means 5 is performed in the time domain.

Generally speaking, the synchronizing means 5 performs a time domain correlation between the reference symbol (or parts of the reference symbol) and a delayed version of the received reference symbol (or parts of the reference symbol) to identify the reference symbol (or parts of the reference symbol) and thus to determine the timing for the synchronization. Thereby, a correlation peak is calculated, which should correspond as accurate as possible to the time point of the last sample of the reference symbol.

In order to achieve a well detectable correlation peak, the reference symbol usually consists of a plurality of synchronization patterns, which are repeated several times within one reference symbol period. The synchronization patterns usually have the same shape or form and are thus called repetition patterns throughout the present application. A reference symbol therefore contains several repetition patterns, whereby each repetition pattern consists of a plurality of samples. Each repetition pattern has the same number of samples. Between the reference symbol and the adjacent user data symbols, guard intervals can be inserted to avoid intersymbol interference in a multipath environment of the telecommunication system.

The time domain correlation of the received reference symbol in the receiving apparatus 1 can be achieved on the basis of an auto correlation mechanism or a cross correlation mechanism. An auto correlation mechanism thereby does not require any knowledge about the reference symbol on the receiver side, whereby a cross correlation mechanism requires exact knowledge about the reference symbol to be received on the receiver side. As stated above, the present invention particularly relates to a receiving apparatus and a synchronizing method which use a cross correlation mechanism.

A known cross correlation means 7 is shown in FIG. 2. The cross correlation means 7 cross correlates incoming signals y(i), e. g. coming from the IQ demodulation means 4, within a cross correlation window of a length 16. The cross correlation window length 16 means that the incoming digital signal y(i) is cross correlated sample by sample on the basis of a length of 16 samples. The cross correlation window length of 16 samples can thereby correspond to the length of a repetition pattern of the reference symbol. In FIG. 3, a reference symbol comprising 9 repetition patterns is shown, whereby one repetition pattern can comprise 16 samples. The receiving apparatus 1 knows exactly the structure of the reference symbol to be received. A complex conjugated version of an expected repetition pattern is stored in the synchronizing means 5 and cross correlated to the received signals.

The cross correlation means 7 of FIG. 2, which has a cross correlation window length of 16, comprises 15 delay means 8 arranged serially. The first delay means delays the incoming complex signal y(i) by one sample, which corresponds to multiplication with a factor $z^{-1}$. The second delay means delays the output of the first delay means again by 1 sample and so on. Further, the cross correlation means 7 comprises 16 multiplication means 9 and a sum means 10. The delay means 8, the multiplication means 9 and the sum means 10 are arranged so that an incoming signal having a length of 16 samples is cross correlated with a complex conjugated version of the samples of a repetition pattern. The complex conjugated samples of the expected repetition pattern are stored in the synchronizing means of the receiver (although the samples can be stored elsewhere) and read out respectively to the multiplication means 9. In one embodiment, a first received sample y(0) is multiplied with a complex conjugated version of the first sample of the expected repetition pattern, i. e. $y^*(0)=s_0^*$. The next received sample y(1) is multiplied with $y^*(1)=s_1^*$ and so forth. The sum means 10 adds up all the results from the multiplication means 9, 50 that an output signal r(i) is obtained. The output signal r(i) of the sum means 10 is supplied to an absolute value calculating means 11 which calculates the absolute value of r(i) to detect a cross correlation peak. The cross correlation means 7 and the absolute value calculating means 11 shown in FIG. 2 can be comprised in the synchronizing means 5 of the receiving apparatus 1 shown in FIG. 1.

In FIG. 3, the cross correlation peak detection performed by the cross correlation means 7 and the absolute value calculating means 11 shown in FIG. 2 is explained. FIG. 3 shows three different phases of a cross correlation calculation of an incoming signal. In phase 1, the correlation window 13 of the cross correlation means 7 is located on received user data, which means that only user data are cross correlated. The user data are indicated by "??? . . . ". Thus, no cross correlation peak is detected. In phase 2, the correlation window 13 is exactly matching with the eighth repetition pattern S7 of the reference symbol 12, so that a corresponding cross correlation peak is detected. In phase 3, the cross correlation window 13 is again cross correlating user data "??? . . . ", so that no cross correlation peak is detected.

The reference symbol 12 shown in FIG. 3 comprises 9 repetition patterns S0, S1, . . . , S8, which have identical shapes. Each of the repetition patterns comprises e. g. 16 samples, which corresponds to the cross correlation window length 16 of the cross correlation means 7 in FIG. 2. Of course, the number of repetition patterns in the reference symbol 12 and the number of samples in each repetition pattern can be changed and adopted to the respective application.

As stated above, the cross correlation mechanism requires exact knowledge on the reference symbol to be received on the receiving side. This means, that the receiving apparatus needs to know exactly the structure and number of repetition patterns to be able to recognize the last cross correlation peak, which serves for a time and frequency synchronization. On the other hand, if one of the cross correlation peaks is not properly detected, the synchronization fails. In mobile communication environments, in which multipath fading degrades the correlation peak detection performance, the synchronization performance in a known receiving apparatus of the telecommunication system is thus significantly lowered.

SUMMARY OF THE INVENTION

The object of the present invention is therefore to provide a receiving apparatus for receiving signals in a digital telecommunication and a synchronizing method for synchronizing a receiving apparatus in a digital telecommunication system, which provide an improved synchronization performance and accuracy.

This object is achieved by a receiving apparatus and a synchronizing method.

The receiving apparatus for receiving signals in a digital telecommunication system comprises receiving means for receiving a reference symbol comprising at least two repetition patterns, whereby one of said at least two repetition patterns is phase shifted in relation to the other repetition pattern, and synchronizing means for synchronizing the receiving apparatus in the digital telecommunication system using said received reference symbol, whereby said synchronizing means comprises a cross correlation means for cross correlating at least one of said two repetition patterns within a cross correlation window having a predetermined length.

The synchronizing method for synchronizing a receiving apparatus in a digital telecommunication system comprises the steps of receiving a reference symbol comprising at least two repetition patterns, whereby one of said at least two repetition patterns is phase shifted in relation to the other repetition pattern, and synchronizing the receiving apparatus in the digital telecommunication system using said received reference symbol, whereby at least one of said two repetition patterns is cross correlated within a cross correlation window having a predetermined length.

The receiving apparatus and the synchronizing method of the present invention thereby provide an improved cross correlation performance for time and frequency synchronization, particularly accurate information on the synchronization timing. The present invention is especially efficient for synchronization in a mobile telecommunication environment in which multipath fading degrades the synchronization performance and accuracy. The receiving apparatus and synchronizing method of the present invention are applicable to single carrier systems as well as multicarrier systems, e. g. OFDM (Orthogonal Frequency Division Multiplexing) systems.

Advantageously, said at least two repetition patterns are the last two repetition patterns in the reference symbol. It is to be noted, that the synchronizing mechanism of the present invention only requires two repetition patterns. Since the two repetition patterns are phase shifted in relation to each other, accurate information on the synchronization time point can be achieved by observing the cross correlation peak and the relative phase of the cross correlation peak. However, more than two repetition patterns enhance the performance. Advantageously, the phase shifted repetition pattern is phase shifted by 180° in relation to the other repetition pattern. Thereby a very accurate and reliable phase detection is possible.

Advantageously, the phase change information of the two repetition patterns in the reference symbol is used in the synchronizing means to detect a cross correlation peak which indicates the position of the later one of said repetition patterns. The correlation peak information is calculated using the phase change information of the two repetition patterns, which allows an accurate and reliable detection of the correlation peak position and thus the synchronization time point.

According to one aspect of the present invention, the cross correlation means has a cross correlation window length corresponding to the length of one repetition pattern, whereby an output signal of the cross correlation means is supplied to a detection means for detecting the cross correlation peak. In case that the repetition patterns of the used reference symbol respectively have a length of 16 samples, the cross correlation window length is also set to 16 samples so that the cross correlation means is matched to a single repetition pattern. Hereby, the detection means advantageously comprises a delay means for delaying the output signal of the cross correlation means by one repetition pattern length and a subtraction means for subtracting the output signal of the delay means from the output signal of the cross correlation means. Further advantageously, an averaging means can be comprised for smoothening the output signal of the detection means. According to this one aspect of the present invention, a received complex data signal corresponding to the length of one repetition pattern is cross correlated in the cross correlation means and compared in the detection means to the respective succeeding data signal having a length of one repetition pattern. Thus, two repetition patterns are cross correlated one after the other and are then compared to detect a cross correlation peak using the corresponding phase change information.

According to another aspect of the present invention, the cross correlation means has a cross correlation window length corresponding to the length of two repetition patterns for detecting the position of the cross correlation peak. The cross correlation means of the further aspect of the present invention thus directly cross correlates received data signals on the basis of the length of two repetition patterns, which leads to a more complex structure of the cross correlation means, but enables a more effective and sophisticated synchronizing mechanism. In the cross correlation means according to the further aspect, the stored positive and the negative conjugation of the expected repetition pattern can be used for detecting the position of the cross correlation peak.

In both aspects of the present invention it is advantageous, if the output signal of the cross correlation means or the detection means is supplied to a peak threshold detection means and a gap detection means, whereby the cross correlation peak detected by the cross correlation means is confirmed or not on the basis of the detection results of the peak threshold detection means and the gap detection means. In case of the first aspect of the present invention described above, the signal supplied to the peak threshold detection means and the gap detection means is the output signal of the detection means.

Advantageously, the peak threshold detection means detects if the output signal of the cross correlation or the detection means exceeds a predetermined cross correlation peak threshold and the gap detection means detects if the output signal of the cross correlation or the detection means has been below a predetermined gap before the detected cross correlation peak. Hereby, the output signal of the cross correlation or the detection means can be delayed in a delay means before being supplied to said gap detection means. Alternatively, the gap detection means can additionally detect if the output signal of the cross correlation or the detection means has been below the predetermined gap threshold during a predetermined gap time.

Using the peak threshold detection means and the gap detection means, additional criteria are checked to increase the synchronization performance and reliability.

DESCRIPTION OF THE DRAWINGS

The present invention is explained in detail in the following description by means of preferred embodiments relating to the enclosed drawings, in which.

DESCRIPTION OF THE INVENTION

Figure 4:
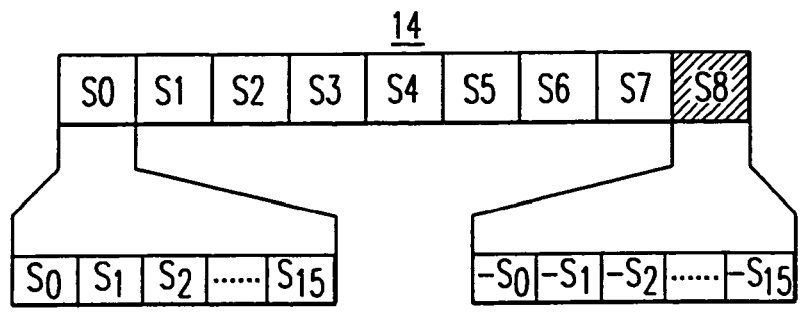
FIG. 4 shows the structure of a reference symbol used for synchronization according to the present invention.

FIG. 4 shows the structure of a reference symbol 14 as example for a reference symbol structure to be used according to the present invention. The reference symbol 14 of FIG. 4 comprises 9 repetition patterns S0, S1 . . . S8. Each repetition pattern has a length of 16 samples so, s, . . . s,5. Thereby, the last repetition pattern S8 is phase-shifted by 180 degrees in relation to the other repetition patterns, which means a multiplication by (−1). Thus, the last repetition pattern S8 comprises 15 samples -so,_S1,-_S15- All repetition patterns of the reference symbol 14 have the same shape, whereby the last repetition pattern S8 is phase-inverted by 180 degrees. It is to be noted, that the reference symbol 14 can have more or less than 9 repetition patterns and that each repetition pattern can have more or less than 16 samples.

Figure 5:
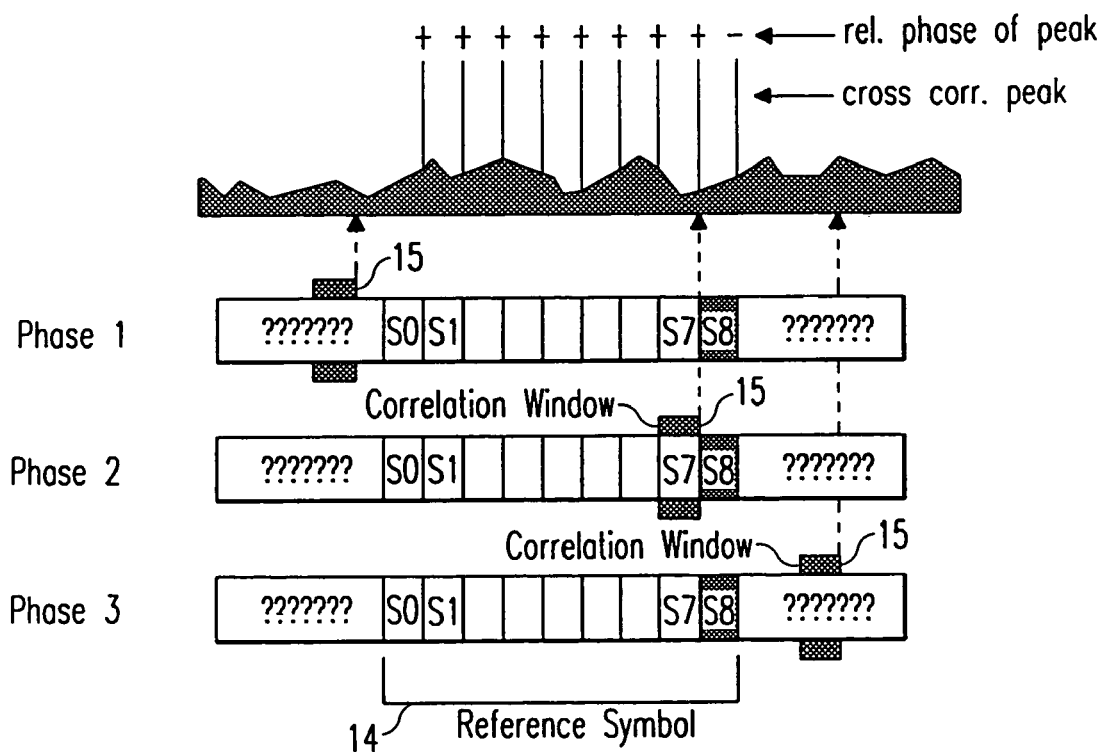
FIG. 5 shows the cross correlation peak detection using the reference symbol shown in FIG. 4.
Figure 6:
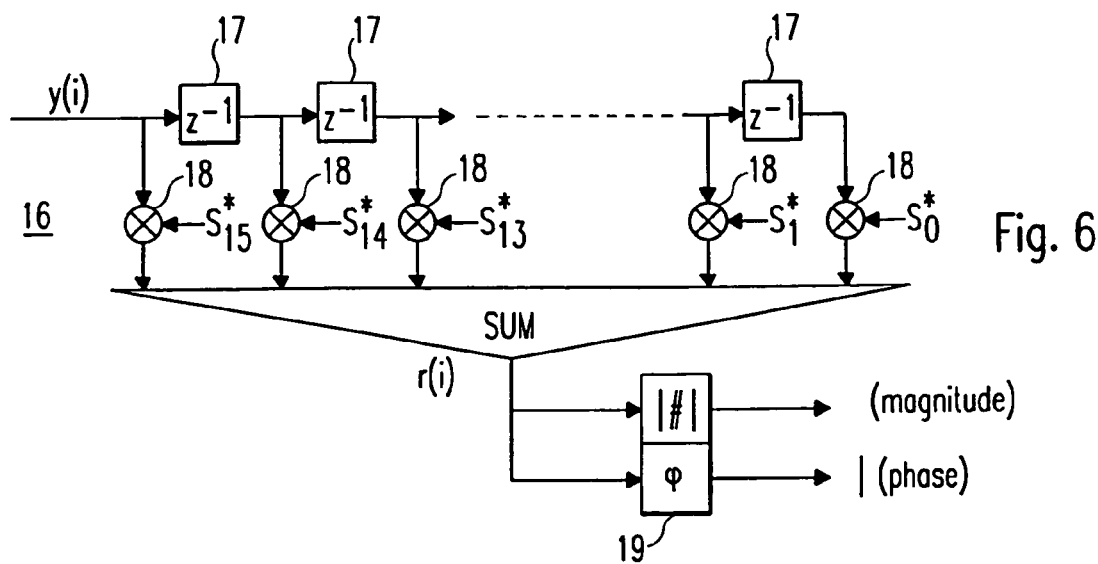
FIG. 6 shows a cross correlation means and a detection means for detecting cross correlation peaks and respective phase information on the basis of a reference symbol as shown in FIG. 4.

In FIG. 5, the reference symbol 14 is shown to be embedded in a user data sequence. The user data are indicated by "??? . . . ". FIG. 5 shows three different phases of cross correlating a received signal having a reference symbol 14, in which the last repetition pattern S8 is phase-inverted by 180°. Relating to the receiving apparatus 1 shown in FIG. 1, the data sequence of the three phases shown in FIG. 5 are for example supplied from the IQ demodulation means 4 to the synchronizing means 5, whereby the synchronizing means 5 is e. g. constructed as shown in FIG. 6. In phase 1, the cross correlation window 15 cross correlates only user data, so that no cross correlation peak is detected. In phase 2, the 8th repetition pattern S7 of the reference symbol 14 is matched by the correlation window 15, so that a cross correlation peak is detected. The relative phase of the cross correlation peak of the 8th repetition pattern S7 is also detected to be "+". Since the 9th repetition pattern S8 is phase-inverted by 180° in relation to the 8th repetition pattern S7, the cross correlation peak detected for the 9th repetition pattern S8 has the relative phase "−" in relation to the phase of the 8th repetition pattern S7. The repetition patterns S0, S1 . . . S6 preceding the two last repetition patterns S7 and S8 have a relative phase "+".

In phase 3 of FIG. 5, only user data are cross correlated in the cross correlation window 15, so that no cross correlation peak is detected. As can be seen in FIG. 5, by using a reference symbol structure like the one shown in FIG. 4, in which one of the repetition patterns is phase-inverted in relation to at least one of the other repetition patterns in the reference symbol, a relative phase information can be obtained additional to the cross correlation peak information. This phase information provides additional information on the position of the last correlation peak in the reference symbol and thus a more accurate and reliable synchronization information.

Figure 1:
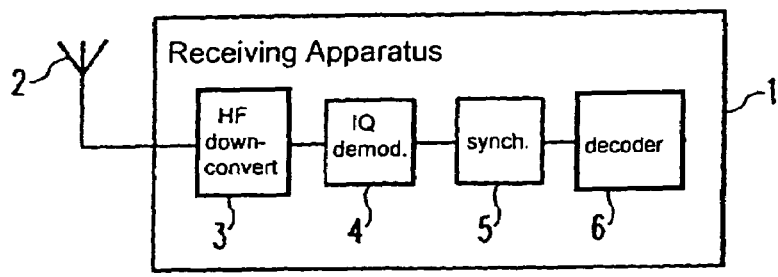
FIG. 1 shows the general structure of a receiving apparatus of a digital telecommunication system.

In FIG. 6, a cross correlation means 16 and a detection means 19 are shown, which can be implemented in a first embodiment of a synchronizing means 5 of a receiving apparatus 1 of the present invention, the general structure of which is shown in FIG. 1. The structure of the cross correlation means 16 is identical to the structure of the cross correlation means 7 shown in FIG. 2, so that a detailed explanation is omitted. The cross correlation means 16 comprises 15 delay means 17 and 16 multiplication means 18 as well as a sum means for adding the outputs of the multiplication means 18. The cross correlation window length of the cross correlation means 16 corresponds to the length of one repetition pattern, which is e. g. 16 samples. A received data stream of 16 samples is cross correlated with complex conjugated samples of an expected repetition pattern stored in the receiving apparatus 1. The output signal r(i) of the sum means, i.e. the output signal of the cross correlation means 16 is supplied to a detection means 19 for detecting the magnitude and the phase of the signal r(i) and therefore the exact position of the cross correlation peak of the last repetition pattern S8 of the reference symbol 14 can be detected (cf. FIG. 5).

Figure 7:
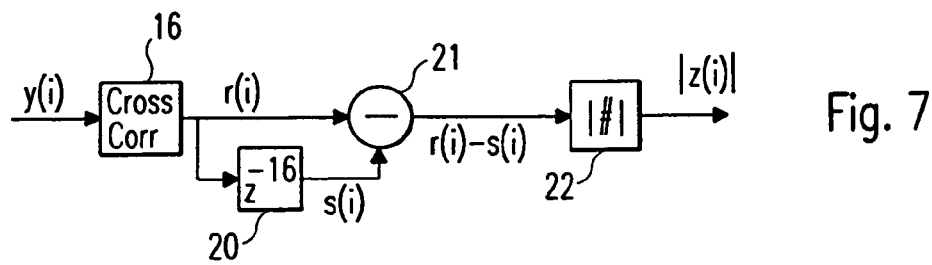
FIG. 7 shows a cross correlation means and another detection means for detecting a single cross correlation peak on the basis of a reference symbol as shown in FIG. 4.

FIG. 7 shows another arrangement of the detection means. The cross correlation means 16 of FIG. 7 corresponds to the cross correlation means 16 of FIG. 6. In the example shown in FIG. 7, the detection means comprises a delay means 20 for delaying the output signal r(i) of the cross correlation means 16 by one repetition pattern length, which is e. g. 16 samples. The detection means 19 further comprises a subtraction means 21 for subtracting the output signal s(i) of the delay means 20 from the output signal r(i) of the cross correlation means 16. The output signal z(i)=r(i)−s(i) of the subtraction means 21 is supplied to an absolute value calculation means 22, which calculates the absolute value of z(i). It is to be noted, that y(i), r(i), s(i), z(i) are complex values so that the magnitude and the phase information is contained in z(i). If it is assumed, that r(i) is in the part of the reference symbol, in which the phase of the repetition patterns is not phase-shifted, for example in the part S0, . . . S7 of the reference symbol 14 shown in FIG. 4, then $s(i)=r(i-16)=r(i) \cdot e^{j\phi} \Rightarrow z_1(i)=r(i)-s(i)=r(i)(1-e^{j\phi})$.

If it is assumed, that r(i) matches with the phase-inverted repetition pattern S8 of the reference symbol 14, then $s(i)=r(i-16)=-r(i) \cdot e^{j\phi} \Rightarrow z_2(i)=r(i)-s(i)=r(i)(1+e^{j\phi})$.

It can be seen that the absolute value of z(i) is enhanced if r(i) matches with the phase-shifted repetition pattern S8. The phase value $\phi$ has nothing to do with the phase shift between the repetition pattern S7 and S8, but results from a possible frequency offset between the transmitter side and the receiver side. Considering the detection range of the phase change introduced by the reference symbol structure according to the present invention under the influence of a frequency offset between the transmitter and the receiver, the following result is obtained: $z_1(i)/z_2(i)=-j \cdot \cot(\phi/2)$. Thus, for a none-ambiguous detection the absolute value of $\phi$ has to be smaller than $\pi$, whereby the phase value $\phi$ is the product between the frequency offset and the duration $T_p$ of one repetition pattern, $\phi=2\pi f_{offset} T_p$.

Figure 8:
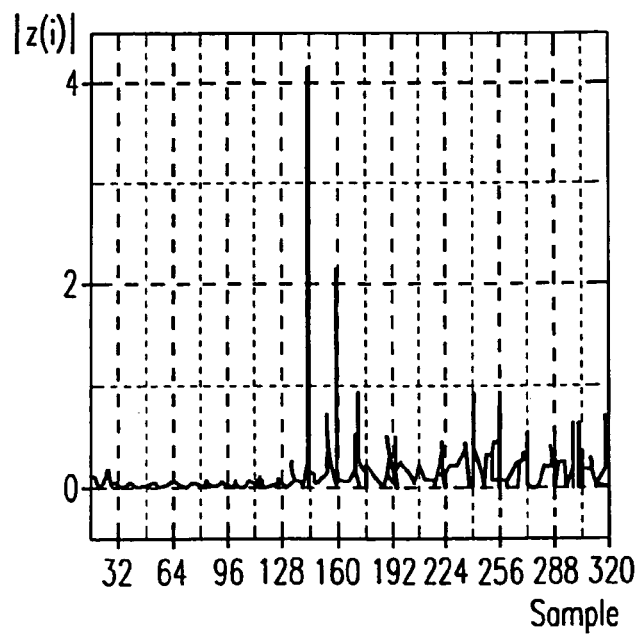
FIG. 8 shows a synchronization result of the cross correlation means and the detection means of FIG. 7.

In FIG. 8, a simulation result for the absolute value of z(i) as the output signal of the structure shown in FIG. 7 is shown. For the reference symbol 14 comprising 9 repetition patterns, whereby each repetition pattern consists of 16 samples, and whereby the phase of the last repetition pattern S8 is inverted in relation to the phase of the other repetition patterns, the cross correlation peak is expected to be at the last sample, i.e. the time point corresponding to the last sample, of the last repetition pattern S8. As can be seen in FIG. 8, the cross correlation peak is located at sample 144, which is the correct value. Thus, the cross correlation means 16 and the detection means 19 shown in FIG. 6 and in FIG. 7 enable a correct and efficient detection of the cross correlation peak.

Figure 9:
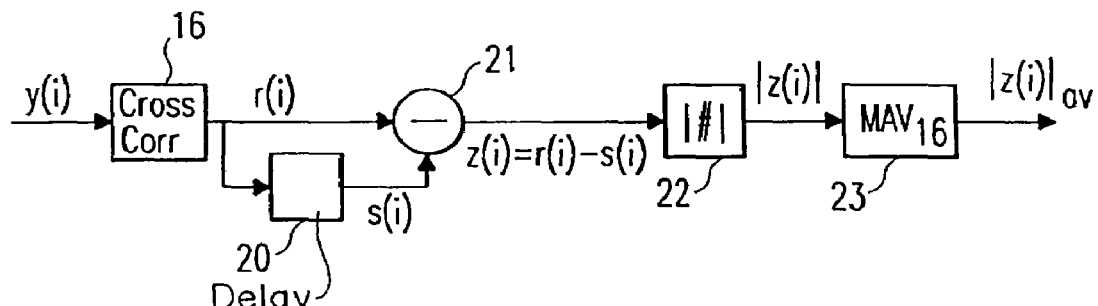
FIG. 9 shows a further embodiment of the detection means of FIG. 6.
Figure 10:
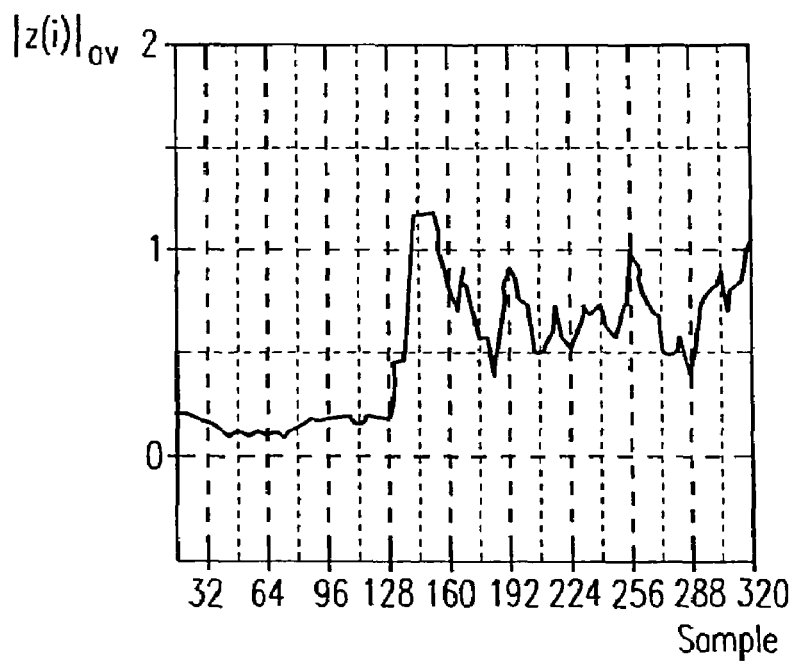
FIG. 10 shows a simulation result of the cross correlation means and the detection means of FIG. 9.

In FIG. 9, the cross correlation means 16 and another embodiment of the detection means of FIG. 7 are shown. Thereby, the structure shown in FIG. 9 corresponds to the structure shown in FIG. 7, whereby the output of the absolute value calculating means 22 is supplied to an averaging means 23 for smoothening the absolute value of z(i) output from the means 22. The structure shown in FIG. 9 is particularly advantageous in severe noise and fading environments. The averaging means 23 advantageously is a moving average filter having a filter length corresponding to the length of one repetition pattern, which is for example 16 samples as shown in FIG. 4. The cross correlation structures shown in FIG. 7 and 9 can e. g. be implemented in the synchronizing means 5 of the receiving apparatus 1 shown in FIG. 1. p FIG. 10 shows a simulation result for the averaged absolute value of z(i) as the output signal of the structure shown in FIG. 9. The detection of the last repetition pattern having an inverted phase as shown in FIG. 4 can be seen in the transition between sample 128 and sample 144.

Figure 11:
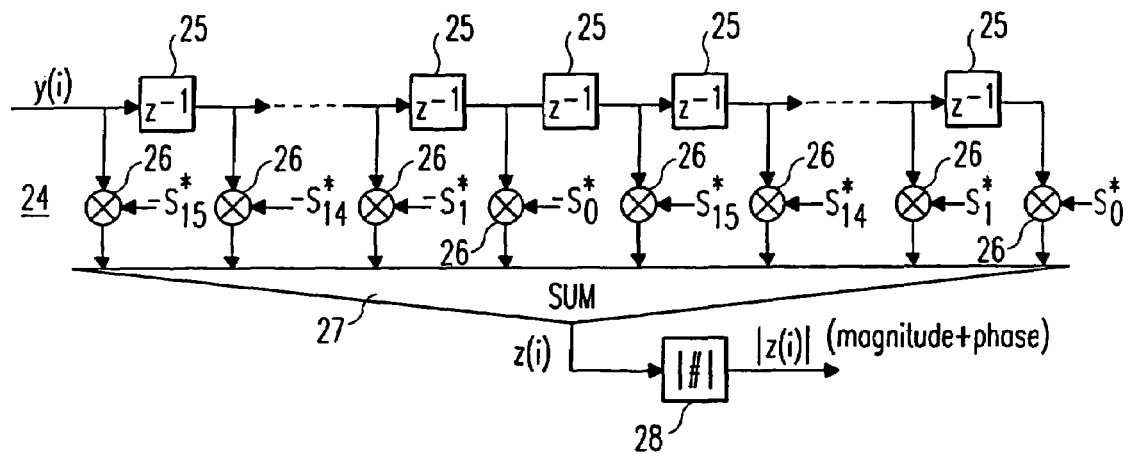
FIG. 11 shows a further embodiment of a cross correlation means according to the present invention together with an absolute value calculation means.

In FIG. 11, a second embodiment of a cross correlation means 24 is shown, which can be implemented in a synchronizing means 5 of a receiving apparatus 1 of the present invention, a general structure of which is e. g. shown in FIG. 1.

Figure 2:
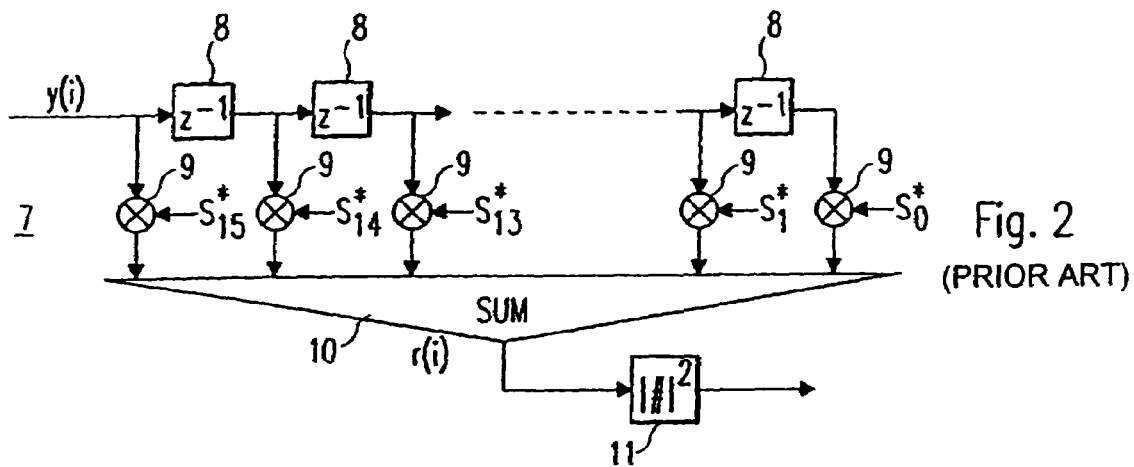
FIG. 2 shows a known cross correlation means and absolute value calculation means for detecting a cross correlation peak.
Figure 3:
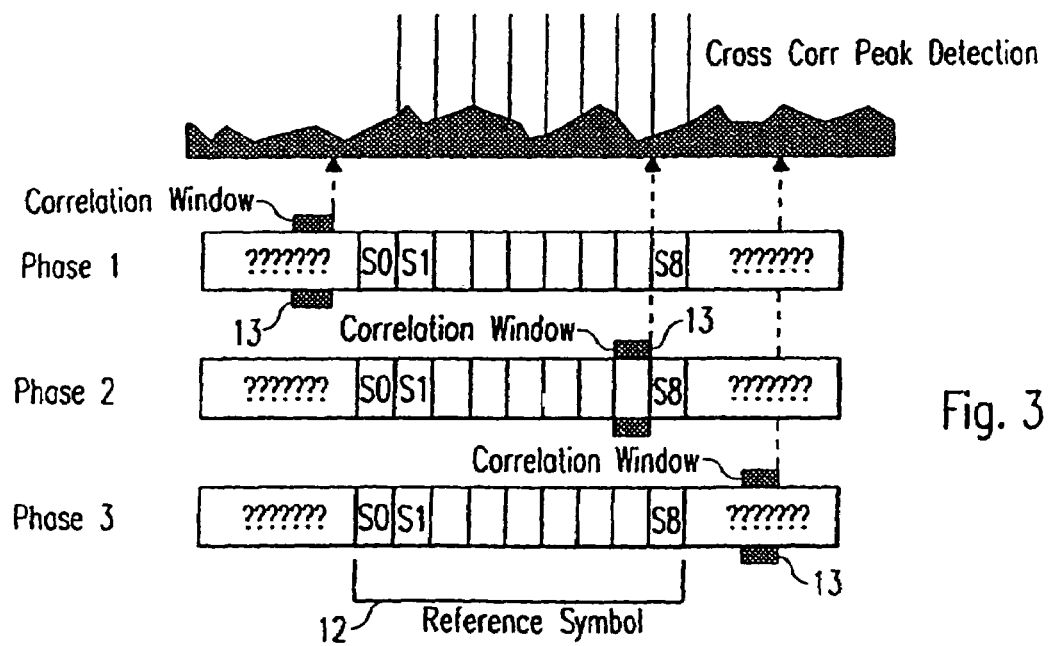
FIG. 3 shows the cross correlation peak detection performed by the cross correlation structure of FIG. 2.

The cross correlation means 24 essentially has the same structure as the cross correlation means 16 shown in FIG. 6 and the cross correlation means 7 shown in FIG. 2. The main difference is, that the cross correlation means 24 shown in FIG. 11 has a cross correlation window length of two repetition patterns, which in the shown example corresponds to 32 samples, when the structure of the reference symbol shown in FIG. 4 is assumed. Thereby, the cross correlation means 24 comprises 31 delay means 25, which are arranged serially and respectively cause a delay of one sample. Further, the cross correlation means 24 comprises 32 multiplication means, which multiply the respective (delayed) samples of the received signal y(i) with stored positive and negative complex conjugated values of the samples of the expected repetition pattern. Thereby, e. g. the first sample entering the cross correlation means 24 is multiplied with the first complex conjugated sample $s_0^*$ of the expected repetition pattern. The same is true for the rest of the samples entering the cross correlation means 24, which are respectively multiplied with the rest of the stored (positive) complex conjugated samples $s_1^*$ to $s_{15}^*$. The second 16 samples entering the cross correlation means 24 are respectively multiplied with the stored negative complex conjugated samples $-s_0^*$ to $-s_{15}^*$ of the expected repetition pattern. Hereby, e. g. the first sample entering the means 24 is multiplied with the negative value of the complex conjugated first sample of the expected repetition pattern $-s_0^*$. The same is true for the rest of the second 16 samples entering the means 24 which are respectively multiplied with the negative values of the complex conjugated values, namely $-s_1^*$ to $-s_{15}^*$. It is to be noted, that the values $s_0, s_1, \ldots, s_{15}$ of the repetition patterns S0, S1, . . . , S8, of the reference symbol 14 shown in FIG. 4 are respectively the same. In other words, all the repetition patterns S0, S1, . . . , S8 of the reference symbol 14 of FIG. 4 have the same shape, except that the last repetition pattern S8 has an inverted phase.

The outputs of the multiplication means 26 of the cross correlation means 24 are added up in a sum means 27, which generate an output signal z(i). The output signal z(i) of the sum means 27 is supplied to an absolute value calculation means 28, which calculates the absolute value of z(i). The output signal of the absolute value calculation means 28 therefore provides information on the magnitude as well as on the phase of the data signals, which are cross correlated by the cross correlation means 24.

Figure 12:
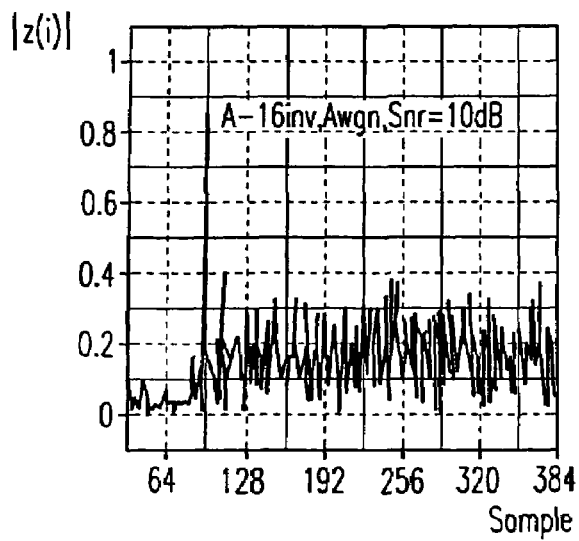
FIG. 12 shows a simulation result of the cross correlation means and the absolute value calculation means shown in FIG. 11 for detecting a cross correlation peak.

A simulation result for the output of the absolute value calculation means 28 of the structure shown in FIG. 11 is shown in FIG. 12. In this case, a reference symbol similar to the reference symbol 14 shown in FIG. 4 had been used, but only with 6 repetition patterns, whereby each repetition pattern consists of 16 samples. The phase of the last repetition pattern is shifted by 180° in relation to the other preceding repetition patterns. Thus, the position of the last sample of the last repetition pattern is expected to be at sample position number 96, which is clearly visible in the simulation result shown in FIG. 12. FIG. 12 shows clearly, that the output signal has a maximum exactly when a correct overlapping between the two repetition patterns processed in the cross correlation means 24 is achieved.

Figure 13:
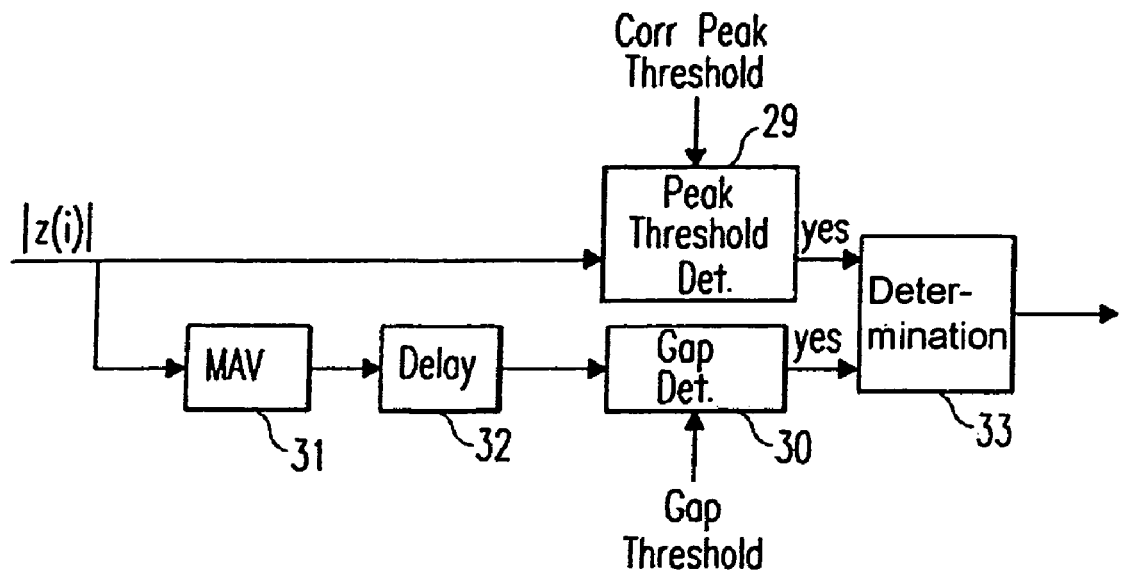
FIG. 13 shows a further embodiment of a synchronizing structure according to the present invention comprising a cross correlation means according to the present invention and a peak threshold detection means and a gap detection means.

FIG. 13 shows an extended structure for increasing the reliability and accuracy of the output signal of the absolute value calculation means 22 of the structure shown in FIG. 7, the averaging means 23 of the structure shown in FIG. 9 or the absolute value calculation means 28 of the structure shown in FIG. 11. In the improved structure shown in FIG. 13, the respective output signal of the cross correlation means 24 or the detection means 19, which is the absolute value of z(i), is supplied to a peak threshold detection means 29 and a gap detection means 30. The peak threshold detection means 29 detects if the absolute value of z(i) exceeds a predetermined cross correlation peak threshold. The gap detection means 30 detects if the absolute value of z(i) has been below a predetermined gap threshold before said detected cross correlation peak. In FIG. 12 it can be seen, that the absolute value of z(i) is zero or close to zero as long as the data signals entering the cross correlation means are in the part of the reference symbol, where the phase of the repetition patterns is not inverted in relation to each other. Hereby, a presynchronization can be achieved, since the detected correlation peak is only confirmed when the gap in front of the correlation peak is detected.

In other words, the gap in front of the correlation peak can be used to identify the range for the possible position of the cross correlation peak. Only when the peak threshold detection means 29 detects that the absolute value of z(i) exceeds the predetermined cross correlation threshold and the gap detection means detects that the absolute value of z(i) has been below a predetermined gap threshold before the detective cross correlation peak, the cross correlation peak is confirmed. In this case, the peak threshold detection means 29 and the gap detection means 30 send respectively a positive information to a determination means 33, which can for example be an AND gate, which outputs the position of the detected cross correlation peak only in case of a positive signal from both of the means 29 and 30. In front of the gap detection means 30, an averaging means 31 and/or a delay means 32 can be located. The averaging means 31 can for example be a moving average filter to smoothen the absolute value of z(i). The filter length preferably corresponds to the length of one repetition pattern of the reference symbol. The delay means 32 preferably provides a delay corresponding to the length of one repetition pattern of the reference symbol. The averaging means 31 as well as the delay means 32 can be provided or not depending on the application.

Figure 14:
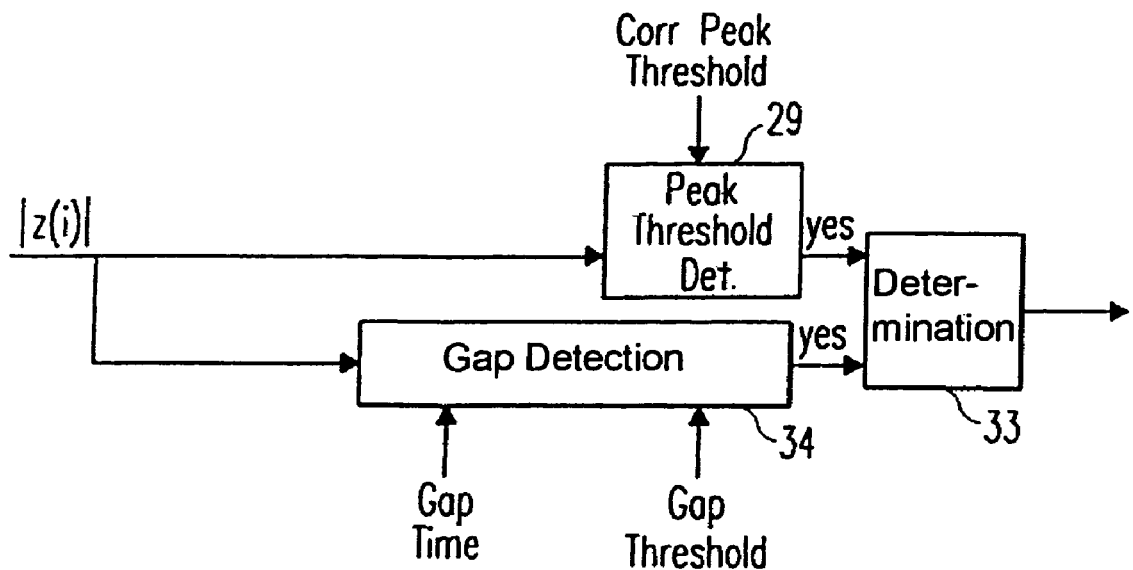
FIG. 14 shows an alternative structure to the embodiment shown in FIG. 13.

FIG. 14 shows an alternative structure to FIG. 13. In FIG. 14, the absolute value of z(i) is supplied to a peak threshold detection means 29 identical to the peak threshold detection means 29 of FIG. 13. The gap detection means 34 shown in FIG. 14 detects if the absolute value of z(i) has been below a predetermined gap threshold before the detected cross correlation peak and additionally detects if it has been below the predetermined gap threshold during a predetermined gap time. In the contrary to the gap detection means 30 of FIG. 13, which only checks one time point before the detected cross correlation peak, the gap detection means 34 of FIG. 14 checks a time period before the detected cross correlation peak. Identically to FIG. 13, a determination means 33, which can for example be an AND gate, determines if the output signals from the peak threshold detection means 29 and the gap detection means 34 are both positive and confirms the detected correlation peak to be the required correlation peak for that case. Both structures shown in FIGS. 13 and 14 provide an increased detection accuracy and reduce the false alarm possibility by combined detection of a presynchronization and a correlation peak detection. The presynchronization, i.e. the detection of the gap in front of a detected cross correlation peak enables to detect the range of possible synchronization peak positions, what can be used to reduce the number of computations needed for the succeeding synchronisations.

It has to be noted, that although the cross correlation and synchronization structures shown in FIGS. 6, 7, 9, 11, 13 and 14 can be implemented in the synchronizing means 5 of the receiving apparatus 1 shown in FIG. 1, these inventive structures can be implemented or used in any other receiving apparatus as long as the scope of the present invention as defined in the enclosed claims is met.

The invention claimed is:

1. A receiving apparatus for receiving signals in a OFDM telecommunication system, comprising:

receiving means for receiving a reference symbol comprising a plurality of successive repetition patterns, wherein each of said repetition patterns comprises a number of samples, the number of samples being the same for each repetition pattern, and whereby one repetition pattern of said repetition patterns is phase-shifted in relation to the other repetition patterns; and synchronizing means for performing a time and frequency synchronization of the receiving apparatus in the OFDM telecommunication system using said received reference symbol, said synchronizing means comprising correlation means for correlating the plurality of repetition patterns within a correlation window having a predetermined length, and said synchronizing means including detection means that detects a phase of each of the plurality of repetition patterns in said reference symbol and uses the phase-shift information of said one repetition pattern in relation to the other repetition patterns in said reference symbol to detect a correlation peak which indicates the position of said one repetition pattern.

2. A method for synchronizing a receiving apparatus in a OFDM telecommunication system, comprising:

receiving a reference symbol comprising a plurality of successive repetition patterns, wherein each of said repetition patterns comprises a number of samples, the number of samples being the same for each repetition pattern, and whereby one repetition pattern of said repetition patterns is phase-shifted in relation to the other repetition patterns; and synchronizing the receiving apparatus in time and frequency in the OFDM telecommunication system using said received reference symbol by correlating the plurality of repetition patterns within a correlation window having a predetermined length and by detecting a phase of each of the plurality of repetition patterns in said reference symbol and detecting a correlation peak which indicates the position of said one repetition pattern using the phase-shift information of said one repetition pattern in relation to the other repetition patterns in said reference symbol.

3. A receiving device for receiving OFDM signals transmitted from a transmitter device in an OFDM system, comprising:

receiving means for receiving a reference symbol comprising a sequence of a plurality of repetition patterns, wherein said reference symbol is transmitted from said transmitter device by using a multicarrier of said OFDM system and one repetition pattern of said sequence of plurality of repetition patterns is phase-shifted in relation to the other repetition patterns; and synchronizing means for synchronizing the receiving apparatus in the OFDM system by detecting a phase of each of the plurality of repetition patterns in said reference symbol and correlating said plurality of repetition patterns to perform a time domain synchronization, and for detecting a frequency offset between said transmitter device and said receiver device in said OFDM system to perform a frequency synchronization by using said repetition patterns including said phase-shifted repetition pattern.

4. A method for synchronizing a receiving apparatus to OFDM signals transmitted from a transmitter device in an OFDM system, comprising:

receiving a reference symbol comprising a sequence of a plurality of repetition patterns, wherein said reference symbol is transmitted from said transmitter device by using a multicarrier of said OFDM system and one repetition pattern of said sequence of plurality of repetition patterns is phase-shifted in relation to the other repetition patterns; and synchronizing the receiving apparatus in the OFDM system by detecting a phase of each of the plurality of repetition patterns in said reference symbol and correlating said plurality of repetition patterns to perform a time domain synchronization, and detecting a frequency offset between said transmitter device and said receiver device in said OFDM system to perform a frequency synchronization by using said successive repetition patterns including said phase-shifted repetition pattern.

5. A receiving device for receiving OFDM signals transmitted from a transmitter device in an OFDM system, comprising:

receiving means for receiving a reference symbol comprising a sequence of a plurality of repetition patterns, wherein said reference symbol is transmitted from said transmitter device by using a multicarrier of said OFDM system and one repetition pattern of said sequence of plurality of repetition patterns is phase-shifted in relation to the other repetition patterns; and synchronizing means for synchronizing the receiving apparatus in the OFDM system by detecting a phase of each of the plurality of repetition patterns in said reference symbol and correlating said plurality of repetition patterns to perform a time domain synchronization, and for performing a frequency synchronization by detecting a frequency offset between said transmitter device and said receiver device in said OFDM system based on a phase change information introduced by said reference symbol.

6. A method for synchronizing a receiving apparatus to OFDM signals transmitted from a transmitter device in an OFDM system, comprising:

receiving a reference symbol comprising a sequence of a plurality of repetition patterns, wherein said reference symbol is transmitted from said transmitter device by using a multicarrier of said OFDM system and a last repetition pattern of said sequence of plurality of repetition patterns is phase-shifted in relation to the other repetition patterns; and synchronizing the receiving apparatus in the OFDM system by detecting a phase of each of the plurality of repetition patterns in said reference symbol and correlating said plurality of repetition patterns to perform a time domain synchronization, and performing a frequency synchronization by detecting a frequency offset between said transmitter device and said receiver device in said OFDM system based on a phase change information introduced by said reference symbol.

* * * * *